United States Patent Office 3,472,801
Patented Oct. 14, 1969

3,472,801
METHOD OF MAKING PARTICULATE POLYMER FOAMS
Frank Lerman and Raymond C. Bartsch, Cincinnati, Ohio, assignors to National Distillers and Chemical Corporation, New York, N.Y., a corporation of Virginia
No Drawing. Continuation-in-part of application Ser. No. 557,641, June 15, 1966. This application Feb. 10, 1967, Ser. No. 615,066
Int. Cl. C08f 47/10
U.S. Cl. 260—2.5                               14 Claims

ABSTRACT OF THE DISCLOSURE

Foamed spherical particles are prepared by the steps of melting, with or without subdividing, a polymer containing a blowing or foaming agent and then further heating at a higher temperature to expand the particles into a porous state with spherizing.

---

This application is a continuation-in-part of copending application Ser. No. 557,641 (filed June 15, 1966), now abandoned.

This invention relates to foamed thermoplastic polymers, particularly to low density, discrete, foamed thermoplastic polymer particles, and to a process for preparing them.

Finely-divided thermoplastic resins are used where it is either impossible or inconvenient to utilize the resins in conventional cube or pellet form. In dry form, powdered organic polymeric thermoplastic resins are used to coat articles by dip coating in a stationary or in a fluidized bed, by powder coating wherein the powder is applied by spraying or dusting, by flame spraying, and by electrostatic attraction. Thermoplastic resin powders have been applied in dispersed form as coatings by roller coating, spray coating, slush coating, dip coating, and electrostatic coating to substrates such as metal, paper, paperboard, and the like. These powders have also been widely employed in conventional powder molding techniques as paper pulp additives; as mold release agents for rubber; as additives to waxes, paints, and polishes; as binders for non-woven fabrics; and so forth.

There is a growing need for thermoplastic resin powders for specialized purposes in research, e.g., as aerosol tracers in air dissemination studies; as particle simulants and standards for chemical, biological, meteorological, radioactive, air-contamination, and oceanography studies. Ideally, these materials should have consistent and stable properties. It should be possible to readily prepare these materials and control or standardize their properties by selection of the polymeric material, additives, processing media, and operating conditions. Through such controlled production, the subsequent classification for average particle size and size distribution could be minimized or even avoided. In cases where color is added, uniformity of color distribution among and within the particles is a major advantage for overall color effects of the powder or of the products formed from it or in particle detection and quantitative determinations in dispersion and tracer studies. The spherical shape would contribute superior flow and fluidization characteristics and improved dispersibility to the powders.

The present invention provides materials and methods for making discrete free-flowing low-density, essentially spherical, porous particles having an average particle size ranging from a few microns up to over a millimeter in diameter. These particles have special physical, chemical, mechanical, aerodynamic, and electrostatic properties that are controllable by means of the polymer selected, the foaming agent, the extent and method of foaming, the operating conditions, and the colorants and/or other additives incorporated or blended into the polymer before subdividing or into the resultant particles. The particles of this invention can have smooth, continuous outer surfaces and highly porous interiors or they can have open porous structure both in the interior and at the surface of the individual particles.

In the process disclosed in copending application Ser. No. 557,641, blends are made of polymeric materials and coloring agents with or without other additives. The blend was introduced as coarsely subdivided solids or as a hot liquid extrudate together with a suitable dispersing agent into a vessel containing water. The mixture was heated to or at a temperature above the softening point of the polymer blend and was vigorously agitated to form finely-divided spherical particles dispersed in the liquid. The dispersion was then cooled rapidly, for example by venting the agitated vessel to reduce the pressure in it when the liquid medium was water or another volatile liquid operated under pressure. Then the cooled product was recovered, for example by filtration, washing, and drying.

In general the process of the present invention involves the steps of melting, with or without subdividing, a polymer containing a blowing or foaming agent and then further heating at a higher temperature to expand the particles into a porous state with spherizing and incidental coalescence of the particles, particularly the smaller ones. In one embodiment, the process involves (1) melting and (2) dispersing in a liquid, with or without subdividing or spherizing, a granular, powdered, or extruded polymer, colored or natural and with or without other additives, but containing a blowing or foaming agent; (3) further heating and dispersing particles to expand or foam them with spherizing and possible coalescence; (4) cooling the expanded particles while still in the dispersed state; and (5) collecting and separating the resulting particulate foams from the carrier medium.

In another embodiment (1) the mixture of a thermoplastic polymer containing a blowing agent and a liquid is heated to above the melting point of the polymer in the presence of a surfactant; (2) the hot mixture is agitated vigorously to produce a fine dispersion; (3) the dispersed particles are further heated; (4) the expanded particles are cooled while still in the dispersed state; and (5) the resulting particulate foams are collected and separated from the carrier medium.

A third embodiment involves the steps of (1) heating and agitating a mixture of a thermoplastic polymer containing a blowing agent and a liquid to above the melting point of the polymer in the presence of a surfactant; (2) further heating the dispersed particles to expand or foam them with spherizing and possible coalescence; (3) cooling the expanded particles while still in the dispersed state; and (4) collecting and separating the resulting particulate foams from the carrier medium.

In still another embodiment polymeric materials containing an epanding agent, with or without colorants and other additives, are (1) subdivided either mechanically or in liquids and then dried, as described above; (2) dispersed in a gas stream to form a fluidized bed; (3) heated, (4) melted, and (5) expanded; (6) cooled; and (7) recovered from the gas stream as foamed particles.

Polymeric materials, particularly thermoplastic resins such as ethylene and propylene homopolymers and copolymers, containing a blowing, foaming, or gas-forming agent dispersed therein are dispersed into finely-divided, spherical particles in a liquid medium, e.g., water, with the aid of a surfactant or dispersing agent, using vigorous agitation and heating above the softening point of the polymer. By raising the temperature to the point required to decompose, vaporize, or expand the gas or gas-generating agent, sufficient gas volume is formed in the particles to cause them to expand and thus give them a porous structure.

Heating may also cause the particles to fuse together into larger ones, to become more spherical, to acquire a smooth continuous surface, and to become more uniform in size by coalescence of the finer particles into larger ones. When a volatile liquid medium, e.g., water under pressure, is used, the particle dispersion is then cooled, usually by quickly venting the reactor to reduce the pressure in the agitated vessel. The cooled mixture is then separated from the dispersing medium to recover and collect the foamed particles, which are then dried as required to produce the particulate foam product.

It is also possible to fluidize finely subdivided polymeric material in a gas stream. It can then be heated to soften the particles and activate the gas-forming agent in order to expand the particles. The foamed particles are then cooled while still in the dispersed state and collected.

Heating softens or melts the polymer containing the blowing agent, whether in the form of granules, mechanically-ground particles, or very finely-divided irregular particles. Vigorous agitation with the dispersing medium and surfactant forms an aqueous dispersion of droplets from the molten polymer, with or without subdivision, depending upon the particle size, amount and type of surfactant, and other conditions. When the temperature is high enough, the gas-forming agent is activated, and a gas is generated by decomposition or volatilization. This gas acts upon the molten polymer droplets to expand them and make them porous. Coalescence between smaller droplets may occur to form larger particles and then spherize them. The holes in the particle surface, caused by escaping gas, may be fused over by the heat. Then rapid cooling of the reaction system solidifies these droplets in their expanded form.

If sufficient gas is generated so that some gas escapes from the particles without appreciable refusion of the surface, then with specific reactants and under carefully controlled conditions open-pore particles can be formed.

Mechanically-ground as well as other irregularly-shaped particles of thermoplastic homopolymers in the size range of about 10 microns to about 0.25 inch can be processed in the above-described manner except that agitation is started simultaneously with the heating and was continued throughout the heating cycle. Spherical particles of various sizes are produced. The original particles may be with or without colorants, blowing agents, and other additives. The product size depends upon the type of polymer, the amount of surfactant, the amount and type of blowing agent added, and the original size of the particles. Some, particularly the large irregular particles, are reduced in size to very fine spherical particles. The irregular particles of intermediate and small size, i.e., below about 500 microns, tend to retain their original size when spherized unless excessive surfactant is used, in which case reduction in particle size tends to occur. In other cases, particularly with the addition of blowing agents, or increase in temperature, finer particles tended to fuse into larger particles to produce narrow size-distribution ranges.

The process of this invention is applicable to any polymeric material that can be softened or melted with heat, expanded by a gas that is generated from within the material, and then solidified by cooling. The material should have neglibible or only slight solubility in the dispersing medium, and it should be able to form an intimate mixture with the selected gas or gas-forming liquid or solid.

Although this invention will be described with reference to polyethylene, it is to be understood that the scope of the invention includes other olefin homopolymers and copolymers, polyamides, acrylic resins, polystyrene, cellulosics, polyesters, vinyl resins, fluorocarbons, and the like, and mixtures and copolymers of these. Specific examples of suitable thermoplastic resins include polyvinyl chloride, polyvinyl acetate, vinyl chloride/acetate copolymers, polyvinyl alcohol, polyvinyl acetal, ethylene/vinyl acetate, ethylene/vinyl propionate, ethylene/vinyl isobutyrate, ethylene/vinyl alcohol, ethylene/methyl acrylate, ethylene/ethyl acrylate, ethylene/ethyl methacrylate, ethylene/allyl alcohol, ethylene/allyl acetate, ethylene/allyl acetone, ethylene/allyl benzene, ethylene/allyl ether, ethylene/acrolein, polyhexamethylene, adipamide, polyhexamethylene sebacamide, polycaprolactam, polymethyl methacrylate, polyacrylonitrile, polymethyl acrylate, polyethyl methacrylate, styrene/methyl methacrylate, and so forth.

To produce a colored foamed particle, a coloring agent may be compounded with the bulk polymer or it may be applied to the finished product. It may be any suitable pigment, dye, opacifier, brighteners, and fluoroscent agent, or the like. If compounded with the bulk polymer, the colorant must be heat-stable at the dispersion temperature of the polymeric material, should not react chemically with the polymeric material, and preferably should exhibit negligible or moderate solubility in water or the other liquid medium used. Moreover, the colorant should preferably be light-stable and should not "bleed" or "migrate" from the thermoplastic resin after dispersion. Examples of suitable materials include carbon black, phthalocyanine blue, fluorescent coloring agents, certain organic and inorganic dyes, phthalocyanine green, cadmium sulfide, cadmium sulfide selenide, titanium dioxide, calcined iron oxide, chromic oxide, zinc oxide, and the like. The porous particles may be colored after formation by adding colorants to coat, diffuse, or be adsorbed in the particles.

In dispersing the polymeric materials in a liquid, a surfactant is used. This is believed to aid in the formation of the dispersion and prevents the reagglomeration of the particles by coating the individual particle surfaces. Under controlled conditions, it could also cause further subdivision of the particles.

Suitable surfactants are water-soluble block copolymers of ethylene oxide and propylene oxide. They are preferably water-soluble block copolymers of ethylene oxide and propylene oxide having a molecular weight above about 3500 and containing a major proportion by weight of ethylene oxide. Such compounds are both stable and effective as dispersing agents for thermoplastic polymers at temperatures ranging up to about 500° F. or higher, and more particularly at temperatures above about 280° F., especially temperatures in the range of about 280° F. to 400° F. Representative of such compounds are those prepared by polymerizing ethylene oxide on the ends of a preformed polymeric base of polyoxypropylene. Both the length and the molecular weight of the polyoxypropylene base and the polyoxyethylene end segments can be varied to yield a wide range of products. One example of a suitable surfactant is a polyoxypropylene having an average molecular weight of 2700 polymerized with ethylene oxide to give a product having a molecular weight averaging about 13,500; it contains about 20 weight percent of propylene oxide and about 80 weight percent of ethylene oxide. Other effective agents include (a) 50 weight percent each of propylene oxide and ethylene oxide, molecular weight 6500; (b) 20 weight percent of propylene oxide and 80 weight percent of ethylene oxide, molecular weight 11,250; (c) 20 weight percent of propylene oxide and 80 weight percent of ethylene oxide, molecular weight 16,250; and (d) weight percent each of propylene oxide and ethylene oxide, molecular weight 4500.

The ratio of the surfactant to the polymer-blowing agent blend in the reactor may range from about 0.10 to about 2.0 parts by weight of the surfactant per part of polymer-blowing agent with a preferred range of about 0.20 to about 1.0 part.

For water-polyethylene dispersions, about 1 to about 20 parts by weight of water are used per part of the resin-blowing agent, the preferred range being about 2.5 to about 10 parts.

Any suitable gas-generating agent can be used, the foaming or blowing agent being any substance that is capable of being dispersed uniformly throughout the composition without appreciably decomposing and which is capable of liberating a gas upon being heated to an elevated temperature, preferably at a temperature near that at which the polymer or resin particles soften or melt. Suitable agents include solid organic compounds such as benzene sulfonyl hydrazide, 4,4'-oxybis(benzenesulfonyl hydrazide), azodicarbonamide, 4,4' - oxybis(benzenesulfonyl semicarbazide), N,N'dimethyl-N,N'-dinitrosoterephthalamide, N,N' - dinitrosopentamethylene tetramine, 4,4'-diphenyldisulfonyl azide, 4-tertiarybutylbenzol azide, diazoaminobenzene, azohexahydrobenzonitrile, 2,2'-azoisobutyronitrile; solid inorganic compounds such as ammonium oxalate, ammonium sulfanate, ammonium thiosulfate, ammonium bicarbonate, sodium bicarbonate, sodium nitrate; combinations of inorganic compounds which react upon being heated to evolve volatiles, e.g., sodium nitride plus hydrated sodium acetate, sodium bicarbonate plus sodium hydrogen tartrate; and so forth.

For a given polymer, the choice of the blowing agent depends upon the fusion temperature of the polymer, the decomposition range of the blowing agent, the rate of heating to be used in foaming, the desired properties of the foam, and so forth. Generally a blowing agent with a decomposition temperature above the fusion or melting temperature of the polymer should be chosen, although with rapid rates of heating, blowing agents with lower decomposition temperatures can be utilized. Ultimate choice of the preferred blowing agent to use with a particular polymer can be arrived at by one skilled in the art through simple routine tests.

The amount of blowing agent used deepnds upon the desired degree of expansion and the desired density of the product. The quantity of the gas-generating agent should be at least sufficient to generate the volume of gas required to expand the dispersed, softened particles to the desired size or density. The amount can be estimated by calculations based on the chemistry of the agent, the molecular weights of the gases formed, the pressure and temperature of the process, and the desired product density. Generally the amount required ranges between about 0.1 and 15 percent by weight, based on the total weight of the polymer. Above about 25 percent, the foams tend to show large and uneven pore structure and to be unnecessarily contaminated with blowing agent residues. Less than 0.1 percent is generally ineffective for forming foams. Between 0.1 and 25 percent the amount used will depend upon the required properties of the finished foams. A preferred range of a blowing agent and such as Celogen is between about 5 and 15 weight percent for the purpose of this invention.

The homogeniety of distribution of the blowing agent throughout the polymer powder is critical to the quality of the resulting foam, particularly with respect to pore size and uniformity of pore distribution. Various techniques can be employed to mix the polymer powder with the blowing agent.

The average particle size of the blowing agent should be appreciably finer than the polymer particles or the agent should be soluble in the polymer so that ideally each particle of polymer can have incorporated in it an adequate amount of the blowing agent. Generally the blowing agent suitable for the practice of this invention can be obtained with average particle sizes below about 2 microns and consequently can be used without modification of size. Satisfactory degrees of mixing of the dry ingredients can be readily accomplished by mechanical means, such as tumbling, air agitation, dry spraying, and the like. The resultant mixture is a homogeneous, free-flowing powder, ready for melting with heat into a relatively uniform blend.

The gas-forming agent can be incorporated into the polymeric material by mixing it with the finely-divided or granulated polymer in a twin-cone blender, and then mixing the two on a twin-roll mill, in a Banbury mixer, in a conventional screw extruder, or in other suitable equipment where the heat, either frictional or applied, is controlled to aid the blending of the gas-forming agent into the polymer and at the same time to control or minimize the gas generation of the agent. The blended material, with little or no gas generated, is then cooled and pelletized or granulated by conventional methods.

The foaming temperatures should be above the melting temperature of the foamable polymer. The temperatures should be sufficiently high to soften or melt the polymer and to decompose or volatilize the blowing agent. Generally a foaming temperature ranging from about 200° to 500° F., and preferably about 280° to 420° F., is used. The selected temperature will depend upon the desired particle form and size, the specific foaming agent selected, the type of polymeric material, and colorants or other additive in the polymer.

The pressures of this process should be high enough to prevent the volatilization of the liquid medium at the desired gas-generating or expansion temperature, but not high enough to prevent the blowing or foaming agent from being effective. In general the pressure will range from about 17 to about 420 p.s.i.g. in water dispersions. The preferred pressure will depend upon the temperature at which the process is carried out and the liquid medium used.

The preferred operating conditions will vary with, and must be determined for, the desired particle form size, and density. The desired characteristics of the particle will be determined by the type of polymer used, the type and amount of gas-generating agent incorporated into the polymeric material, the effects of other additives, and the actual operating conditions chosen. The optimum ranges for these variables are determined through experimentation.

The dispersing apparatus may be any device capable of delivering at least a moderate amount of shearing action to a liquid mixture under elevated temperatures and pressures. An example of suitable apparatus is a conventional autoclave equipped with conventional propeller stirrers. A propeller designed to impart greater shear to the mixture can effect the average particle size and size distribution of recovered polymer. The average particle size and size distribution of the powder product are influenced by the type of equipment, agitation time, stirring rate, and other operating and design factors. Higher stirring speeds generally result in finer and narrower dispersions until an optimum speed is reached. The stirring period at dispersion temperatures is generally from about 2 to 24 minutes at agitator tip speeds of from 400 to 1200 linear feet per minute, but preferably about 5 to 15 minutes at tip speeds of about 600 to 1000 linear feet per minute. The stirring rates and periods, however, depend upon the material processed and the type of equipment used.

The dispersing agent need not be incorporated by milling or the like into the polymer in advance but may be introduced into the dispersing apparatus as a solid or as an aqueous solution simultaneously with the other ingredients. If desired, the dispersing process may be operated in a continuous manner.

Drying the recovered finely-divided polymer generally yields a free-flowing powder of fine particle size. In general, these powder particles have a narrow size distribution while the average particle diameter may vary from about 10 to 2000 microns. The average particle size may be controlled by varying the composition of the selected dispersing agent, the ratio of polymer to dispersion medium, and other material concentrations and operating conditions. Especially preferred are powders of narrow particle-size distribution and average particle size less than 200 microns and often desirably less than 20 microns.

The resulting products are low density, discrete, spherical, foamed polymer particles, having a smooth continuous outer surface and a highly porous interior. By adjusting the reactants and operating conditions, it is possible to produce similar particulate foams having open porous structure in the interior and at the surface of the individual particles.

Control of size, density, and color of the final particles by the use of additives and variations of operating conditions can produce tailor-made particles useful as simulants and tracers for airborne and water dissemination studies. With some of the materials, the particles formed naturally assume like charges and produce a mutual particle repulsion and thus a free-flowing powder. This and other properties make them useful for coating, with later fusing, on appropriately charged surfaces of paper or textiles. In larger particles, this activity of the charged particles would make them interesting as an educational and entertaining toy. These electrostatic characteristics of the particles can be modified by blending with additives before or after subdividing and expanding.

The resin containing the blowing agent can be dispersed into fine spherical particles without foaming them; the dry powder can then be deposited electrostatically, by gravity, by blowing, or by other convenient means onto selected areas of paper, plastics, textiles, or the like; and embossed or relief printing is produced by then expanding the particles during the heat fusing process. The use of colorants with the particles would permit colored embossed printing.

The foamed particles can serve as, or be a carrier for, special coatings, inks, colorants and toners in coating, printing, copying, gravure, or duplicating processes on paper and other materials. They can be used for tower packing or as a fluidized bed in unit-operation inter-phase exchanges, as in extraction, adsorption, absorption, and distillation, such as in gas separation by selective adsorption and desorption of gaseous mixtures. They can be applied as a vaporization blanket on the surface of volatile liquids in tanks or ponds. They can be modified by bonding or partial heating or pressure-fusing into special shapes as porous plastic forms for diffusion barriers, filtering media, and the like. The product also can be blown, poured, or otherwise positioned into constrained spaces as light-weight thermal, electrical, mechanical-shock, or sound insulation.

The open-pore particulate foams are especially useful as occluders or carriers of various active agents, such as coloring materials, chemicals, chemical or biological warfare agents for air dispersions, or in matted, compressed, or sintered form for diffusion barriers or filters.

The more detailed practice of the invention is illustrated by the following examples wherein parts are given by weight unless otherwise specified. These examples and embodiments are illustrative only, and the invention is not intended to be limited thereto except as indicated by the appended claims.

EXAMPLE I

To a baffled 1.5-gallon stirred reactor with an air-driven agitator consisting of three 3.68-inch diameter, eight-blade turbine rotors on a single shaft were charged two pounds of −16 mesh granulated polyethylene (density 0.917, melt index 22) containing 7 percent by weight of Celogen OT (a 4,4′-oxybis(benzenesulfonyl hydrazide) sold by Naugatuck Chemical Co.) as blowing agent, 0.36 pound of Pluronic F–98 (a block copolymer of ethylene oxide and propylene oxide sold by Wyandotte Chemical Corp.) as the surfactant, and 6 pounds of water. The reactor was sealed, and heating and agitation at 600 l.f.p.m. were started. When the temperature reached 338° F., the slurry was vented from the reactor into cold water through a quick-opening ball valve in the bottom of the reactor. The product was recovered by filtering, washing, and air drying. The product was foamed polyethylene particles having a number mean diameter of 546 microns and a geometric standard deviation of 1.35.

EXAMPLE II

The procedure of Example I was repeated except that agitation was performed at 900 l.f.p.m. The product particles had a number mean diameter of 254 microns and geometric standard deviation of 1.57.

EXAMPLE III

The procedure of Example I was repeated except that agitation was performed at 1100 l.f.p.m. The product particles had a number mean diameter of 208 microns and a geometric standard deviation of 1.59.

EXAMPLE IV

The procedure of Example I was repeated except that the thermoplastic used was −16 mesh granulated polyethylene (density 0.926, melt index 250) containing 7 percent by weight of Celogen OT. The product particles had a number mean diameter of about 200 microns and a geometric standard deviation of 1.40.

EXAMPLE V

The procedure of Example II was repeated except that (1) the thermoplastic used was a −16 mesh granulated polyethylene (density 0.926, melt index 250) containing 7 percent by weight of Celogen OT and 1% by weight of phthalocyanine blue and (2) 0.63 pound of Pluronic F–98 and 5.8 pounds of water were used. The product particles were blue and had a number mean diameter of about 300 microns and a geometric standard deviation of about 1.85.

EXAMPLE VI

The procedure of Example I was repeated except that the thermoplastic used contained 7 percent by weight of the blowing agent Unicel ND (dinitrosopentamethylene tetramine sold by du Pont) and the temperature was 380° F. The product particles had a number mean diameter of about 700 microns and a geometric standard deviation of about 1.5.

EXAMPLE VII

The procedure of Example I was repeated except that the thermoplastic used was a −16 mesh ethylene-vinyl acetate copolymer containing 7 percent by weight of Celogen OT. The product particles had a number mean diameter of about 500 microns and a geometric standard deviation of about 1.4.

EXAMPLE VIII

The procedure of Example VII was repeated except that the thermoplastic contained 15 percent by weight of Celogen OT. The product particles had a number mean diameter of about 800 microns and a geometric standard deviation of about 1.6.

What is claimed is:

1. A process for preparing foamed spherical thermoplastic powders which comprises the steps of (1) melting a synthetic thermoplastic polymer containing a blowing agent having a decomposition temperature above the melting point of the polymer, (2) adding the melted polymer containing the blowing agent to a vigorously agitated substantially non-solvent liquid heated above the melting point of the polymer in the presence of a block copolymer of ethylene oxide and propylene oxide to produce a fine dispersion, (3) further heating at a temperature above the melting point of the polymer to subdivide the particles and expand them with gas generated from the blowing agent, (4) cooling the expanded particles to below the melting point of the polymer, and (5) recovering the foamed spherical particles, said foamed particles having a size range averaging from about 10 to 1,000 microns in diameter.

2. A process for preparing foamed spherical thermoplastic powders which comprises the steps of (1) heating a mixture of (a) a synthetic thermoplastic polymer containing a blowing agent having a decomposition temperature above the melting point of the polymer and (b) a liquid which is substatially non-solvent for said polymer to above the melting point of the polymer in the presence of a block copolymer of ethylene oxide and propylene oxide, (2) vigorously agitating the hot mixture to produce a fine dipsersion, (3) further heating at a temperature above the melting point of the polymer to subdivide the particles and expand them with gas generated from the blowing agent, (4) cooling the expanded particles to below the melting point of the polymer, and (5) recovering the foamed spherical particles, said foamed particles having a size range averaging from about 10 to 2,000 microns in diameter.

3. A process for preparing foamed spherical thermoplastic powders which comprises the steps of:
   (1) agitaing and heating to above the melting point of the polymer, a mixture of
      (a) a synthetic thermoplastic polymer containing a blowing agent having a decomposition temperature above the melting point of the polymer of, and
      (b) a liquid which is non-solvent for the polymer, in the presence of a block copolymer of ethylene oxide and propylene oxide to produce a fine dispersion;
   (2) further heating at a temperature above the melting point of polymer to subdivide the polymer particles and expand them with gas generated from the blowing agent;
   (3) cooling the expanded particles to below the melting point of the polymer, and
   (4) recovering the foamed spherical particles, said foamed particles having a size range averaging from about 10 to 2,000 microns in diameter.

4. The process of claim 3 wherein the liquid is water.

5. The process of claim 3 wherein said thermoplastic polymer is a polyolefin.

6. The process of claim 5 wherein the polyolefin is an ethylene-vinyl acetate copolymer.

7. The process of claim 5 wherein the polyolefin is polyethylene.

8. The process of claim 3 wherein the block copolymer of ethylene oxide and propylene oxide has a molecular weight above about 3500.

9. The process of claim 3 wherein the mixture is agitated at a temperature between about 200° and 500° F. and at a pressure between 17 and 420 p.s.i.g.

10. The process of claim 3 wherein the polymer is in form of coarsely-divided solids.

11. The process of claim 3 wherein the polymer is in the form of a molten extrudate.

12. The process of claim 3 wherein the polymer is in the form of powders of irregularly-shaped particles.

13. The process of claim 3 wherein the polymer contains a colorant.

14. A process for preparing foamed spherical synthetic thermoplastic powders which comprises subjecting a mixture of (a) a thermoplastic polymer containing about 5 to 15 weight percent of blowing agent having a decomposition temperature above the melting point of the polymer and (b) water to vigorous agitation in the presence of about 0.2 to 1 part by weight of a block copolymer of ethylene oxide and propylene oxide having a molecular weight above about 3500 at a temperature within the range of about 200° to 500° F. and at a pressure between about 17 and 420 p.s.i.g. to melt the polymer and produce a fine dispersion; heating the dispersion to above the melting point of the polymer to subdivide the particles and expand them by the action of gas generated from the blowing agent; and thereafter cooling the expanded particles to below the melting point of the polymer, the water being present in an amount between about 2.5 and 10 parts by weight; the thermoplastic polymer being present in a form selected from the group consisting of coarsely-divided solids, a molten extrudate, and powders of irregularly-shaped particles; and the foamed particles so produced being less than 2,000 microns in diameter.

References Cited
UNITED STATES PATENTS

| | | | |
|---|---|---|---|
| 2,202,481 | 5/1940 | Cox et al. | 264—13 |
| 2,284,023 | 5/1942 | Scripture | 264—12 |
| 2,844,486 | 7/1958 | Lamar | 106—308 |
| 2,943,949 | 7/1960 | Petry. | |
| 3,197,423 | 7/1965 | Ackerman. | |
| 3,308,211 | 3/1967 | Plastridge | 264—5 |
| 3,321,426 | 5/1967 | Dorsey | 260—28.5 |
| 3,371,053 | 2/1968 | Raskin. | |

OTHER REFERENCES

Organic Syntheses, Call. vol. 4, Rabjohn (Ed.) (Wiley) (N.Y.) (1963), p. 474.

MURRAY TILLMAN, Primary Examiner

M. FOELAK, Assistant Examiner

U.S. Cl. X.R.

260—41; 264—5, 13, 53